United States Patent [19]

Ochi

[11] Patent Number: 5,566,642
[45] Date of Patent: Oct. 22, 1996

[54] GRANULAR ABSORBENT MATERIAL FOR PET ANIMAL

[75] Inventor: Kengo Ochi, Kawanoe, Japan

[73] Assignee: Uni-Charm Corporation, Ehime-ken, Japan

[21] Appl. No.: 516,033

[22] Filed: Aug. 17, 1995

[30] Foreign Application Priority Data

Aug. 23, 1994 [JP] Japan .................................. 6-198628

[51] Int. Cl.⁶ .................................................. A01K 1/015
[52] U.S. Cl. .................................... 119/171; 119/172
[58] Field of Search .................................. 119/171, 172; 502/400, 401, 428

[56] References Cited

U.S. PATENT DOCUMENTS

| | | | |
|---|---|---|---|
| 5,100,600 | 3/1992 | Keller et al. | 119/171 X |
| 5,415,131 | 5/1995 | Dodman | 119/171 |
| 5,429,073 | 6/1995 | Ballard | 119/171 |
| 5,489,427 | 2/1996 | Bilbrey | 119/171 X |

*Primary Examiner*—Robert P. Swiatek
*Assistant Examiner*—Elizabeth Shaw
*Attorney, Agent, or Firm*—Lowe, Price, LeBlanc & Becker

[57] ABSTRACT

Granular absorbent material for a pet animal, each grain thereof comprising a core formed from absorbent material, a liquid-impermeable partition sheet parting the core into upper and lower halves and a liquid-permeable sheet covering the core.

4 Claims, 3 Drawing Sheets

GRANULAR ABSORBENT MATERIAL FOR PET ANIMAL

BACKGROUND OF THE INVENTION

The present invention relates to granular absorbent material and, more particularly to, granular absorbent material for pet animal to be spread over a urination tray or evacuation tray and the like used to breed pet animals such as cats or dogs.

It is well known to use granular absorbent material, for example, any one selected from a group consisting of fluff pulp, bentonite, CMC (carboxymethyl cellulose), etc. or a mixture thereof for pet animals.

Such granular absorbent material is usually spread all over a urination or evacuation tray in its practical use and sometimes a quantity of excreted urine flows down through its grains to a bottom of the tray. With a consequence, smell of urine will stick to the bottom of the tray and at least the room in which the tray is placed will uncomfortably reek with urine smell even after the used granular absorbent material has been exchanged with the fresh one.

SUMMARY OF THE INVENTION

In view of the problem as mentioned above, it is a principal object of the invention to solve this problem by providing each grain of granular absorbent material with a partition sheet adapted to part the grain into upper and lower halves and a sheet for covering the grain.

The object set forth above is achieved, according to the invention, by granular absorbent material for pet animal comprising: a plurality of grains; the grains each having a core formed from absorbent material; a liquid-impermeable partition sheet or a liquid permeation retardant sheet parting the core into upper and lower halves; and a liquid-permeable sheet covering the core.

According to a variant of the invention, the partition sheet extends outward beyond a periphery of the core and is bonded along this extension to the liquid-permeable sheet covering the core so as to form a flange around the core.

With the granular absorbent material for pet animals of the arrangement as described above, a quantity of urine tending to permeate the core downward can be prevented by the partition sheet from further permeating downward to a tray's bottom.

By providing the grain of absorbent material with the flange, the flanges of the respective grains of absorbent material may be put one upon another when the grains are spread all over a tray to prevent a quantity of urine from flowing down through interstices which would be formed between each pair of adjacent grains to the tray's bottom.

PREFERRED EMBODIMENTS OF THE INVENTION

Figure 1:
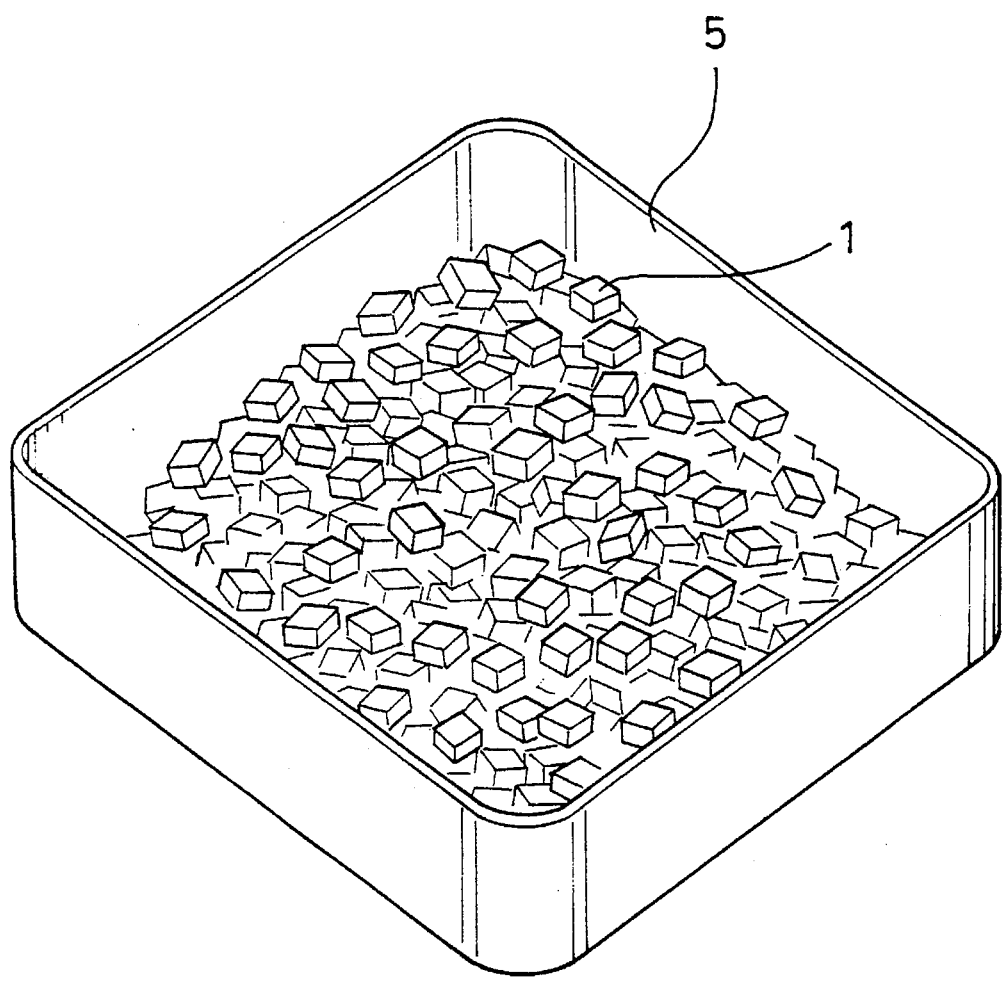
FIG. 1 is a perspective view showing a tray over which grains of absorbent material are spreaded.
Figure 2:
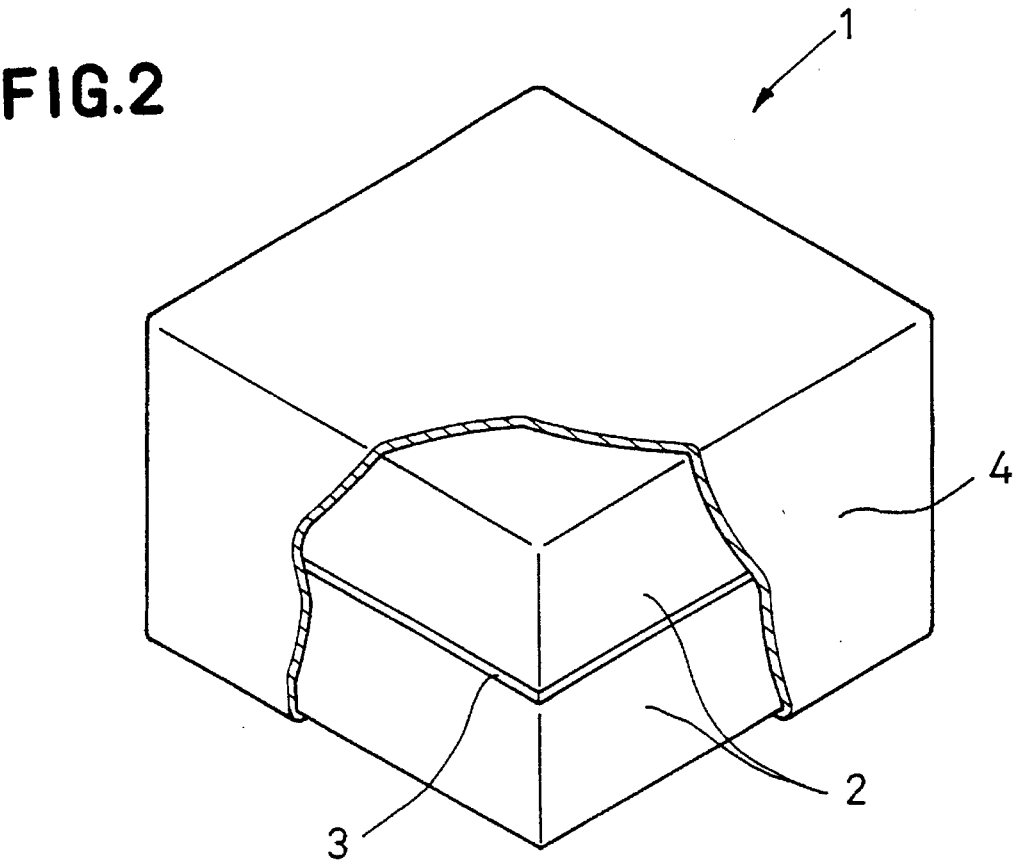
FIG. 2 is a perspective view showing an individual grain as partially broken away.

Referring to FIGS. 1 and 2, individual grains 1 of absorbent material may be in the form of a cube or a rectangular parallelopipedon having width as well as depth of 5 to 150 mm and a height of 5 to 30 mm, and comprises a liquid-absorbent core 2, a liquid-impermeable or liquid permeation retardant partition sheet 3 dividing the core 2 into upper and lower halves, and a liquid-permeable outer sheet with which the core 2 is covered. The core 2 comprises, in turn, liquid absorptive material such as fluff pulp or a mixture of the fluff pulp and highly water absorptive polymer powders, which is usually compression-molded for actual use. The partition sheet 3 serves to part the core 2 into substantially equal two parts in the direction of its thickness and may be made of material such as a plastic film, perforated plastic film or nonwoven fabric. The partition sheet 3 prevents a quantity of urine discharged onto a top surface of each core 2 from permeating this core 2 downward to the bottom of the tray 5. When the sheet 3 is said to be liquid-impermeable, it means that the permeation of urine through the core 2 is substantially stopped at the level of this sheet 3 and, when the sheet 3 is said to be liquid permeation retardant, it means that the permeation rate of urine through the core 2 is retarded by this sheet 3 substantially to shut off further downward permeation of urine.

A quantity of urine permeating the grain 1 downward is forced to permeate this exclusively sideways as urine reaches the sheet 3. In this manner, the presence of the sheet 3 allows the volume of each core 2 to be effectively utilized for absorption of urine. The outer sheet 4 may be made of a nonwoven fabric, perforated plastic film, mesh cloth or the like and serves to keep the core 2 in its shape.

In actual use, the grain 1 of such construction may be spreaded over a tray 5 in an appropriate thickness as shown by FIG. 1. Each grain 1 is preferably dimensioned so as to have its vertical dimension (i.e., thickness) smaller than its longitudinal as well as transversal dimensions and, more preferably, so as to have its vertical dimension less than ½ of both its longitudinal and transversal dimensions in view of an expected result that most of the grains 1 will be placed over the bottom of the tray 5 with their partition sheets 3 being laid substantially in a horizontal posture and larger surface of the grain 1 will face upward. Thus the excreted urine tending to permeate the grain 1 downward toward the bottom of the tray 5 will be effectively prevented by the respective partition sheets 3 from further permeating the grain 1 downward.

Figure 3:
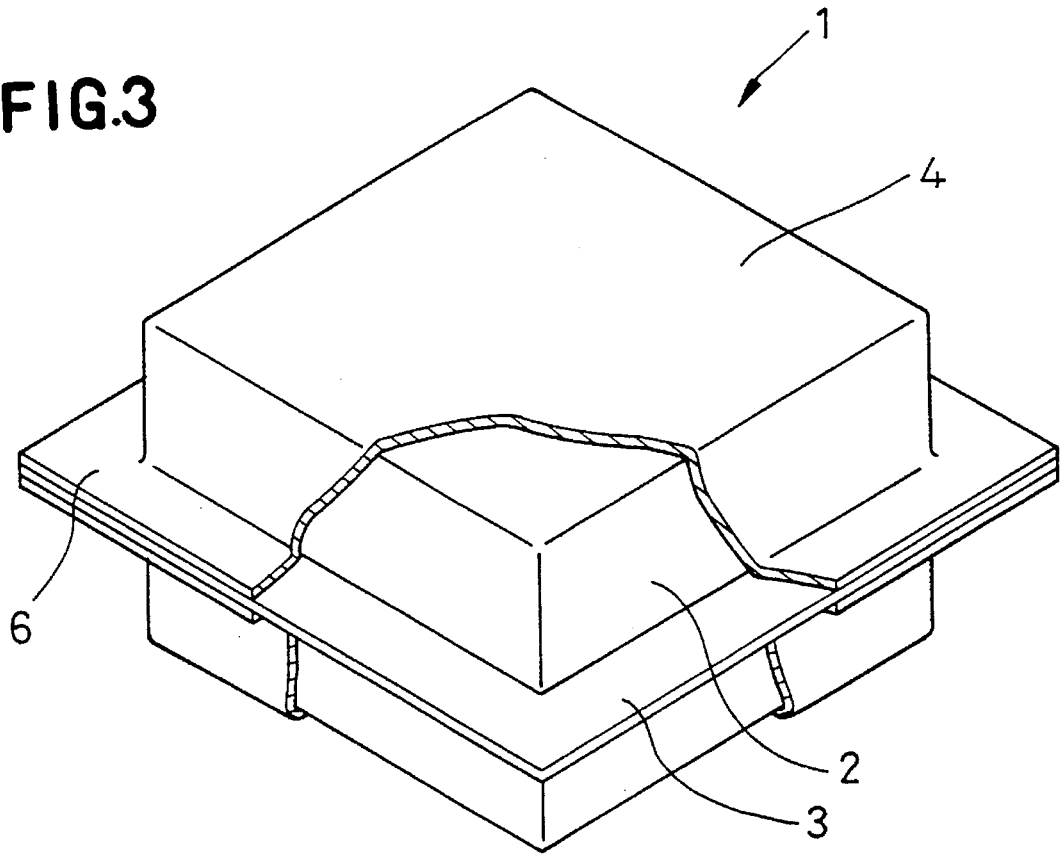
FIG. 3 is a view similar to FIG. 2 showing an individual flanged grain as partially broken away.

Referring to FIG. 3, the partition sheet 3 extends outward beyond a periphery of the core 2 and is bonded along this extension to the outer sheet 4 so as to form a flange 6. Such flange 6 may be dimensioned to have a width of 2 to 15 mm and the flanges 6 of the respective grains are destined to be put one upon another as the grain 1 is thrown into or spread over the tray 5. As a result, the interstices which would otherwise be formed between respective pairs of adjacent grains 1 are shut off by their flanges 6 and further permeation of urine downward through said interstices to the bottom of the tray 5.

Figure 4:
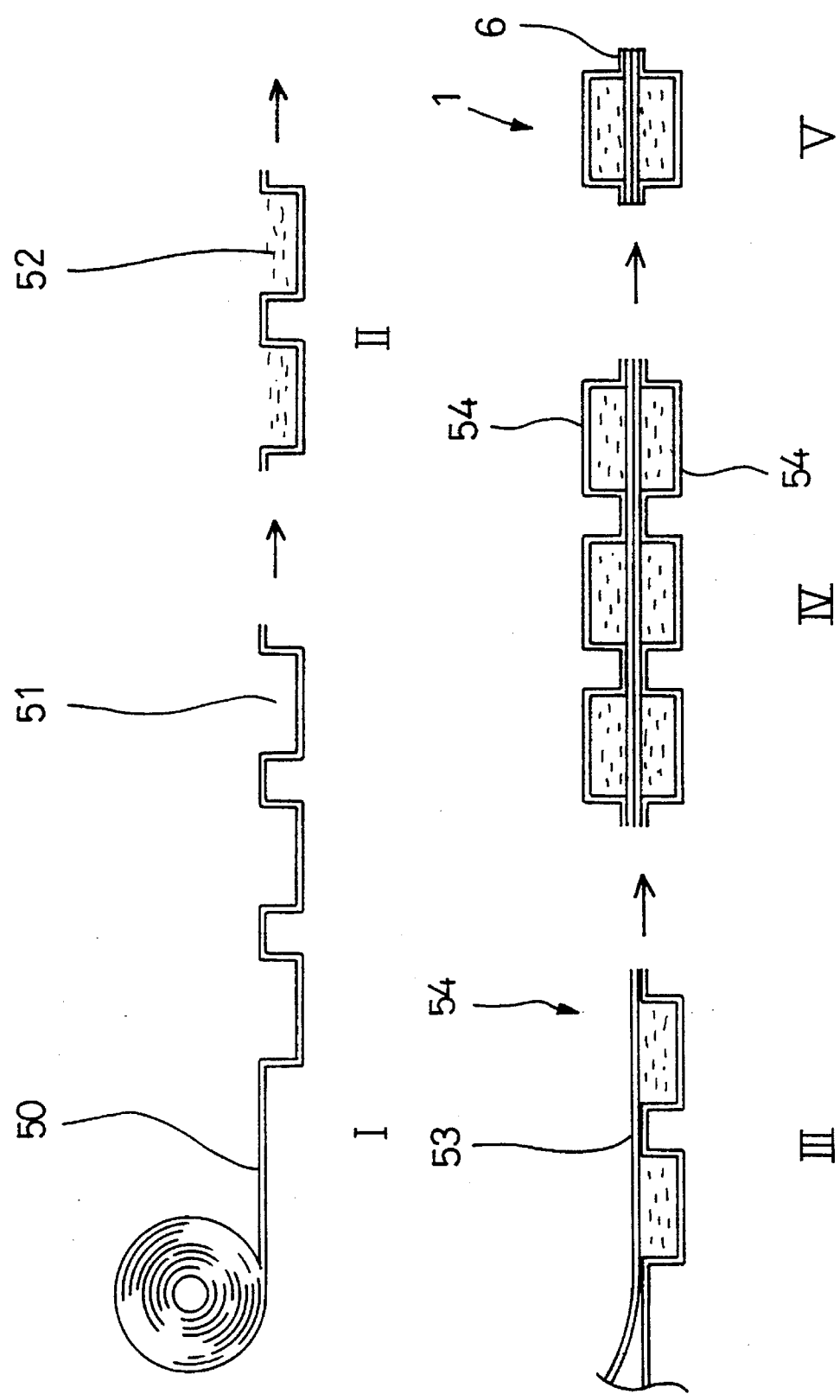
FIG. 4 is a diagram schematically illustrating steps of a method for making the grains.

FIG. 4 is a schematic diagram exemplarily illustrating steps of a method for making each grain 1 of which is shown by FIGS. 1 and 3. A step I is to mold a liquid-permeable nonwoven fabric 50 so as to have a plurality of recesses 51. A step II is to fill these recesses 51 with liquid-absorptive material 52. A step III is to bond a liquid-impermeable plastic film 53 onto a nonwoven fabric 50 and thereby to form continuous capsules 54 each containing liquid-absorptive material 52. A step IV is to place two sets of the continuous capsules 54 one upon another and to bond them to each other over their surfaces defined by the respective plastic films 53. A final step V is to cut this assembled continuous capsules 54 into individual grains 1 at lines of cutting selected so that a desired width of the flange 6 may be obtained. During these steps, bonding of the components may be achieved either by using suitable adhesive such as hot melt adhesive or by heat sealing the components to each other. Side walls of the recesses 51 may be formed with an appropriate tapering. The recesses 51 may be formed in cubes, rectangular parallelopipedons, cylinders or the other polygons. As for the step III, it should be understood that the plastic film 53 may be replaced by the continuous capsules 54 to avoid doubling of the partition sheet 3.

The granular absorbent material of the invention eliminates an apprehension that the bottom of the tray might be smeared with urine, since the individual grain of the absorbent material is divided by the liquid-impermeable or liquid permeation retardant partition sheet into upper and lower halves.

According to the variant of the invention, the individual grain is provided therearound with the flange adapted to be placed on the flanges of the adjacent grains as they are spreaded all over the tray and thereby to prevent any quantity of urine from flowing through the interstices which would otherwise be formed between the respective pairs of adjacent grains down to the bottom of the tray.

What is claimed is:

1. Granular absorbent material for pet animal comprising:
   a plurality of grains;
   said grains each having a core formed from absorbent material;
   a liquid-impermeable partition sheet or a liquid permeation retardant sheet parting said core into upper and lower halves; and
   a liquid-permeable sheet covering said core.

2. Granular absorbent material for pet animal according to claim 1, wherein said partition sheet extends outward beyond a periphery of said core and is bonded along this extension to said liquid-permeable sheet covering said core so as to form a flange around said core.

3. Granular absorbent material for pet animal according to claim 1, wherein said core comprises fluff pulp or a mixture of the fluff pulp and water absorptive polymer powders, which is compression-molded.

4. Granular absorbent material for pet animal according to claim 1, wherein said core is in the form of a cube or a rectangular parallelopipedon having width as well as depth of 5 to 150 mm and a height of 5 to 30 mm.

* * * * *